(12) United States Patent
Pratt et al.

(10) Patent No.: US 9,048,900 B2
(45) Date of Patent: Jun. 2, 2015

(54) ALL DIGITAL TRANSMITTER NOISE CORRECTION

(71) Applicants: Patrick Pratt, Mallow (IE); Peadar Antony Forbes, Cloghroe (IE)

(72) Inventors: Patrick Pratt, Mallow (IE); Peadar Antony Forbes, Cloghroe (IE)

(73) Assignee: ANALOG DEVICES GLOBAL, Hamilton (BM)

( * ) Notice: Subject to any disclaimer, the term of this patent is extended or adjusted under 35 U.S.C. 154(b) by 0 days.

(21) Appl. No.: 13/796,236

(22) Filed: Mar. 12, 2013

(65) Prior Publication Data

US 2014/0269970 A1  Sep. 18, 2014

(51) Int. Cl.
| | | |
|---|---|---|
| *H04B 1/04* | (2006.01) | |
| *H04L 5/14* | (2006.01) | |
| *H04B 1/10* | (2006.01) | |

(52) U.S. Cl.
CPC ............ *H04B 1/0475* (2013.01); *H04L 5/14* (2013.01); *H04B 1/10* (2013.01); *H04B 1/525* (2013.01); *H04L 5/1423* (2013.01); *H04L 5/1461* (2013.01)

(58) Field of Classification Search
USPC .......................... 375/219, 297, 296, 324, 254
See application file for complete search history.

(56) References Cited

U.S. PATENT DOCUMENTS

| | | | |
|---|---|---|---|
| 5,848,097 A | 12/1998 | Carney et al. | |
| 7,869,527 B2 | 1/2011 | Vetter et al. | |
| 8,103,235 B2 | 1/2012 | Shiotsu et al. | |
| 2002/0085647 A1* | 7/2002 | Oishi et al. | 375/297 |
| 2002/0142725 A1 | 10/2002 | Clelland et al. | |
| 2004/0203458 A1 | 10/2004 | Nigra | |
| 2007/0184782 A1 | 8/2007 | Sahota et al. | |
| 2010/0159837 A1* | 6/2010 | Dent et al. | 455/63.1 |
| 2010/0165895 A1 | 7/2010 | Elahi et al. | |
| 2011/0149714 A1 | 6/2011 | Rimini et al. | |
| 2011/0158346 A1 | 6/2011 | Ballantyne | |
| 2012/0295558 A1 | 11/2012 | Wang et al. | |
| 2013/0016798 A1 | 1/2013 | Velazquez et al. | |
| 2014/0194071 A1 | 7/2014 | Wyville | |

FOREIGN PATENT DOCUMENTS

| | | |
|---|---|---|
| JP | H07235894 A | 9/1995 |
| JP | 2009522908 A | 6/2009 |
| JP | 2009526442 A | 7/2009 |

(Continued)

OTHER PUBLICATIONS

Omer et al., "A PA-Noise Cancellation Technique for Next Generation Highly Integrated RF Front-Ends", 2012 IEEE Radio Frequencey Integrated Circuits Symposium, pp. 471-474.

(Continued)

*Primary Examiner* — Kabir A Timory
(74) *Attorney, Agent, or Firm* — Kenyon & Kenyon LLP (57) ABSTRACT

An all digital model of nonlinear transmitter signal distortion in signals received at a receiver of a transmitter-receiver may be used to estimate distortion. The estimated distortion may then be cancelled from the received signals to improve signal quality of the received signal. The digital nonlinear model may be part of an estimator circuit that estimates nonlinear distortion terms by applying a formula or transformation to a digitized version of the signals transmitter at a transmitter of the transmitter-receiver. A mixer may be used to shift a frequency of the estimated nonlinear terms away from a transmitter frequency so that the nonlinear terms can later be subtracted from the incoming signal received at the receiver at a receiver frequency. Circuits and methods are provided.

20 Claims, 5 Drawing Sheets

(56) References Cited

FOREIGN PATENT DOCUMENTS

| JP | 2011509045 A | 3/2011 |
|---|---|---|
| WO | 2007078032 A1 | 7/2007 |
| WO | 2007092767 A1 | 8/2007 |
| WO | 2009088787 A1 | 7/2009 |
| WO | 2009090400 A1 | 7/2009 |
| WO | 2009156510 A2 | 12/2009 |
| WO | WO 2011/148341 A1 | 12/2011 |

OTHER PUBLICATIONS

Amin et al., "Transmit and Receive Crosstalk Cancellation", 2010 6th International Conferences on Emerging Technologies, pp. 210-215.
Multirate and Adaptive Filter, JJ Shynk—Signal Processing Magazine, IEEE, 1992.
Rashid-Farrokhi et al., "Transmit Beamforming and Power Control for Cellular Wireless Systems," IEEE Journal on Selected Areas in Communications, vol. 16, No. 8, Oct. 1998, pp. 1437-1450.
Partial European Search Report dated May 5, 2014, in European Application No. 14158027.4.
European Search Report dated May 20, 2014, in European Application No. 14156668.7.
Araseki, T., "A Frequency Domain Adaptive Loop Canceller for Digital Terrestrial Broadcasting Systems", The Journal of The Institute of Image Information and Television Engineers, vol. 56, No. 8, pp. 1342-1348, Aug. 1, 2002, Japan.
Aparin et al., "Analysis and Reduction of Cross-Modulation Distortion in CDMA Receivers," IEEE Transactions on Microwave Theory and Techniques, vol. 51, No. 5, pp. 1591-1602, May 2003.
Bellanger et al., "TDM-FDM Transmultiplexer: Digital Polyphase and FFT," IEEE Transactions on Communications, vol. 22, No. 9, pp. 1199-1205, Sep. 1974.
Cruz et al., "Receiver Front-End Architectures—Analysis and Evaluation," Advanced Microwave and Millimeter Wave Technologies: Semiconductor Devices, Circuits and Systems, Mar. 2010, pp. 495-520.
Harris, F.J. et al., "Digital Receivers and Transmitters using Polyphase Filter Banks for Wireless Communications," IEEE Transactions on Microwave Theory and Techniques, vol. 51, No. 4, pp. 1395-1412, Apr. 2003.
Kim et al., "Implementation of a High-Throughput Low-Latency Polyphase Channelizer on GPUs," EURASIP Journal on Advances in Signal Processing, vol. 2014:141, Mar. 2014, pp. 1-10.
Navarro, A.P. et al., "Efficient Channelization for PMR+4G and GSM Re-Farming Base Stations," Signals and Systems Conference (ISSC 2012), IET Irish, Jun. 2012, pp. 1-6.
Navarro, A.P, "Channelization for Multi-Standard Software-Defined Radio Base Stations," A thesis presented to the National University of Ireland NUI Maynooth, Oct. 2010, 277 pages.

\* cited by examiner

ALL DIGITAL TRANSMITTER NOISE CORRECTION

BACKGROUND

Full duplex radio frequency (RF) transmitter-receivers and transceivers have been capable of simultaneously transmitting and receiving RF signals. Typically, the transmit bands and the receive bands have been offset from each other to minimize interference at the receiver from the outgoing transmitter signals. Even though the transmit bands are different from the receive bands, components from the transmitted signal may still leak into the received signals at the receiver causing interference. This interference has reduced the sensitivity of the receiver so that the receiver has a reduced capability of receiving fainter signals.

The components leaking into the received signal may be caused by the nonlinear properties of the transmitter-receiver circuits. For example, while transmitter amplifiers have been designed to linearly amplify outgoing signals, in practice manufacturing and other limitations have resulted in nonlinear amplification of different components of the outgoing signal. This nonlinear amplification has distorted the incoming signals received at the receiver. In other instances, other nonlinear properties of the transmitter-receiver circuits, such as nonlinear approximation errors during signal sampling have also distorted the received signals.

Existing solutions for minimizing distortion at the receiver have focused on improving the linearity of these circuits and reducing nonlinear sources of distortion by including additional filters to remove nonlinear terms and improve filter adaptation and convergence rates. These improvements and additional filters have resulted in larger, more expensive circuits with additional elements consuming more power. The larger, more expensive, and power consuming circuits are not suitable for smaller sized portable devices designed to consume less power, such as smart phones, tablets, and other mobile RF devices.

These existing solutions are also not suitable in systems including multiple transmitters and one or more receivers. In systems with multiple transmitters, the signals at each receiver may be distorted by outgoing signals from more than just one transmitter. Existing circuits for minimizing distortion in multiple transmitter systems are too large, expensive, and power consuming for these smaller, portable, battery powered devices.

Finally, transmitters and receivers in these smaller, portable devices may only use a subset of available channels in a designated signal band. In instances where these devices only use a subset of the available channels, any distortion in the unused channels of the signal band need not be removed from the incoming received channels. Existing solutions focused on removing distortions from the entire signal band, including in unused channels. Accordingly, the solutions required extra processing time and power to remove distortions in unused channels even though there was no need to do so.

There is a need for a smaller, low power transmitter noise correction circuit that is able to cost efficiently minimize transmitter signal distortion in received signals. There is also a need for a smaller, low power transmitter noise correction circuit suitable for portable devices that is able to remove distortions from only active channels and/or from multiple transmitters.

DETAILED DESCRIPTION

An all digital model of nonlinear transmitter signal distortion in signals received at a receiver of a transmitter-receiver, including but not limited to a full duplex RF transmitter-receiver, may be used to estimate distortion. The estimated distortion may then be cancelled from the received signals to improve signal quality of the received signal. The digital nonlinear model may be part of an estimator circuit that estimates nonlinear distortion terms by applying a formula or transformation to a digitized version of the signals being transmitted at the transmitter-receiver. Using all digital circuitry to estimate and cancel nonlinear distortion as described herein enables the development and manufacturing of smaller, more cost efficient noise correction circuits that also consume less power.

In those instances where the transmitter and receiver operate at different frequencies, a mixer may be used to shift a frequency of the estimated nonlinear terms of the transmitted signals away from a transmitter frequency so that the nonlinear terms can later be subtracted from the incoming signals at a receiver frequency. In some instances, the mixer may shift the estimated nonlinear terms to an intermediate frequency based on an offset between the transmitter and receiver frequencies.

In some instances the frequency shifted estimated nonlinear terms may be delayed at a delay unit until the nonlinear terms are time aligned with a corresponding section of the incoming signals received at the receiver. This may ensure that the nonlinear terms are subtracted from a corresponding section of the received signals containing the corresponding transmitter interference terms. In some instances a decimator may down sample the estimated nonlinear terms to a frequency matching that of the received incoming signals.

Once the estimated nonlinear terms are at the frequency of the received incoming signals and synchronized with a corresponding section of the received incoming signals containing a corresponding nonlinear interference term, the estimated nonlinear terms may be subtracted from the received incoming signals to remove the noise term from the incoming received signals.

An adaptive engine may also be provided in some instances that compares the digitized transmitted and received signals to the received signals after the noise term has been removed by the subtractor. The adaptive engine may then estimate an error of the nonlinearity model based on the comparison and then generate updated coefficients for the nonlinearity model in order to further reduce the error. The adaptive engine may continue to iteratively estimate the error until the error has been eliminated or otherwise minimized.

An interpolator may be used to interpolate the digitized version of the transmitted analog RF signals to a higher frequency in order to avoid aliasing due to undersampling. The interpolator need not be used in those instances where there is no likelihood of undersampling of the transmitted signal.

As discussed previously, an estimator circuit may estimate nonlinear interference terms by applying a formula or transformation to a digitized version of the transmitted analog RF signals according to a nonlinearity model. Different types of nonlinearity models may be used in different embodiments. In some instances, the nonlinearity model may be configured to model nonlinear terms in the transmitted signal that may interfere with the signals received at the receiver. The nonlinear terms may be modeled based on expected nonlinearities caused by the power amplifier used to amplify the transmitted signal before it is transmitted by the transmitter.

Other nonlinear terms may also be modeled, such as nonlinearities in the transmitter baseband signals caused by predistortion circuits, amplifiers, and/or other sources. While any predistortion that is applied should ideally leave no residual distortion, in practice this does not typically occur. The residual distortion may leak into the signals received at the receiver which may desense the receiver. The estimator circuit may model this residual distortion so that it can be remove from the received signals. Baseband nonlinearities need not be modeled in some instances. For example, modeling of baseband nonlinearities need not occur if there is no or minimal predistortion of transmitted baseband signals.

Other types of nonlinear intermodulation distortion and interference may also be modeled. These other types of nonlinear terms may include any type of nonlinear interference term, including but not limited to cross modulation terms from an external blocker or other device cross modulating with the transmitter, nonlinearity and nonlinear interference terms when leakage from the transmitter mixes into the received baseband signals through a second, third or in general any order distortion at the receiver front end.

In some instances the nonlinear signal distortion model may also include linear terms in addition to nonlinear terms. The linear terms may be used to model certain linear functions, such as the effects of a frequency change in frequency division duplexing mode. Any other types of signal distortion caused by the transmitter, including but not limited to clocking spurs or sampling images, may also be modeled to estimate an impact of the distortion on the received signals. The results of the modeling may be used to cancel and remove the distortions from the received signals.

In instances where the estimator circuit models nonlinear transmitter baseband signal distortion, the nonlinearity may be estimated at least in part according to the following equation:

$$x = \{I_i + jQ_i\}\alpha_0 + \sum_{k=1}^{K_{BB}} \sum_{m=0}^{M_{BB}} \alpha_{k,m} I_i^k(n-m) + j\sum_{k=1}^{K_{BB}} \sum_{m=0}^{M_{BB}} \beta_{k,m} Q_i^k(n-m) \quad (1)$$

In the above equation (1), I may represent an in phase component of the outgoing digital signal, Q may represent an out of phase component of the outgoing digital signal, j may represent the imaginary unit, $\alpha$ and $\beta$ may represent model coefficients of the signal baseband distortion model, m may represent an index (from 0 to $M_{BB}$) corresponding to current (0) and past (1, 2, ..., $M_{BB}$) values of an associated variable, k may represent an order of the nonlinearity where k=1 refers to a linear term, k=2 refers to a second order term, and so on, n may represent a time index based on a discrete time or instance, and x may represent an output of the modeled nonlinear transmitter baseband.

In instances where the estimator circuit models nonlinear distortion from the transmitter at the receiver, the nonlinear distortion may be estimated at least in part according to the following equation:

$$y = \sum_{k=0}^{K_{RF}} \sum_{m_1=0}^{M_1} \sum_{m_2=0}^{M_2} a_{k,m_1,m_2} |x(n-m_1)|^{2k} x(n-m_1-m_2) \quad (2)$$

In the above equation (2), a may represent model coefficients of transmitter signal distortion model, $m_1$ and $m_2$ may represent different indices of the variable m for comparing different current (0) and/or past (1, 2, ..., $M_{BB}$) values of an associated variable, and y may represent an output of the modeled nonlinear distortion from the transmitter at the receiver. When, for example, $m_1=m_2=0$, then the index $n-m_1-m_2=n$ corresponds to a current sample index having no past values. The term $m_1$ may also refer to a memory depth of the RF envelope or an amplitude modulation term such as $|x(n-m_1)|$ while the term $m_2$ may refer to a cross term between an amplitude modulation $|x(n-m_1)|$ and complex envelope terms $x(n-m_1-m_2)$).

In different embodiments, different modeling equations may be used. For example, in some instances a Volterra series or a memory polynomial function may be used instead of or in addition to equations (1) and/or (2).

Figure 1:
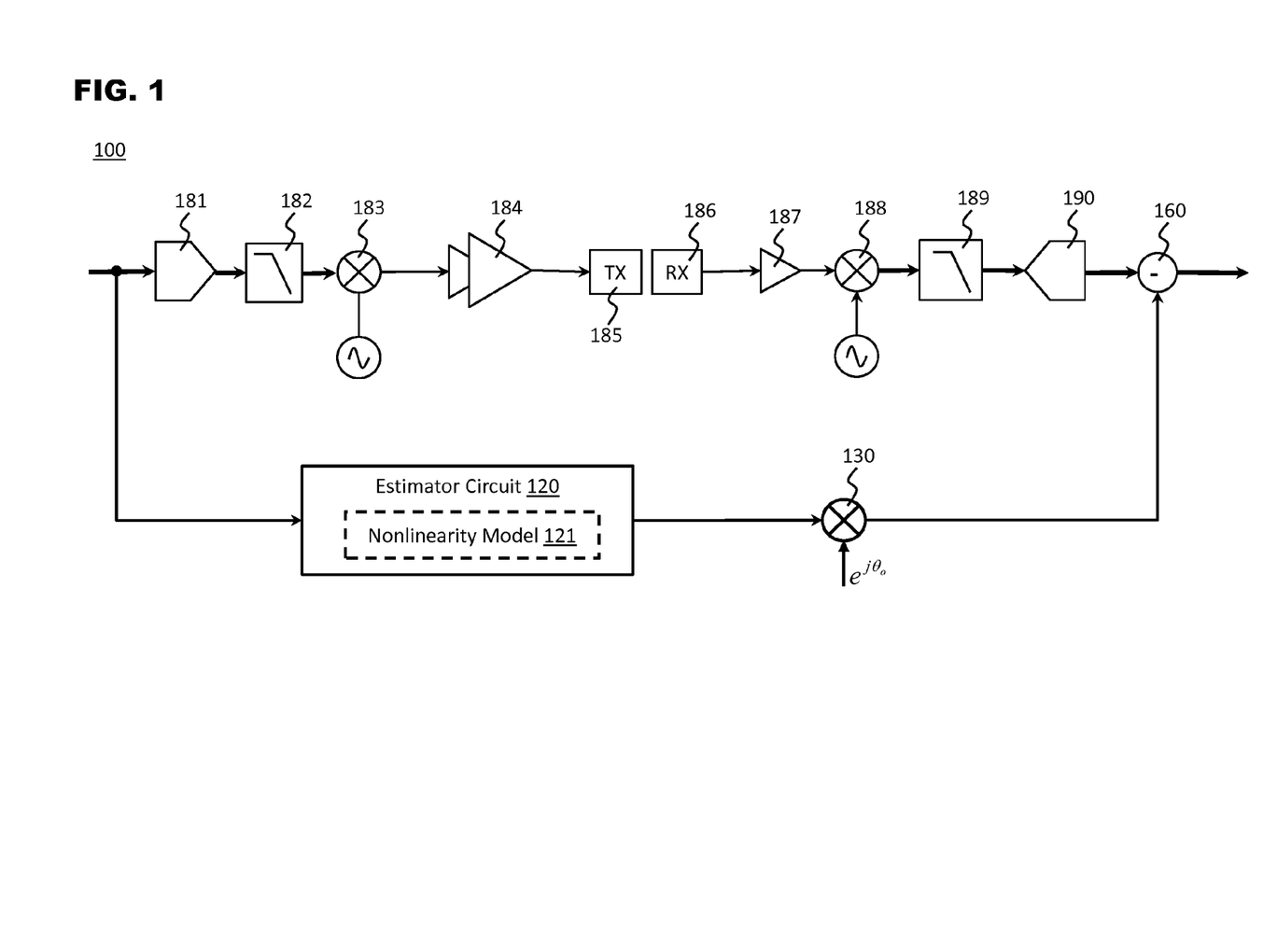
FIG. 1 shows a first exemplary circuit in an embodiment of the invention.

FIG. 1 shows a first exemplary all digital noise correction circuit 100 for a full duplex radio including a transmitter 185 and receiver 186. In circuit 100, an outgoing digital signal to be transmitted at transmitter 185 may be converted to an analog signal at an analog-digital converter (ADC) 181. A copy of the outgoing digital signal may also be routed to an estimator circuit 120.

The estimator circuit 120 may include a nonlinearity signal distortion model 121 that may include a filter and/or other components modeling nonlinear distortion from the transmitter 185 at the receiver 186 of a full duplex radio. The nonlinear distortion may be modeled based on an analysis of a copy of an outgoing digital signal that is converted to an analog signal and transmitted at the transmitter.

A mixer 130 may be coupled to estimator circuit 120. The mixer 130 may mix an output of the estimator circuit with a frequency offset signal. This mixing may shift the estimator circuit output to an intermediate frequency offset representing a difference between a transmit frequency and a receive frequency of the radio.

A subtractor 160 may be coupled to the mixer 130 and an ADC 190 converting a received incoming analog signal to digital code. The subtractor 160 may subtract the frequency shifted estimator circuit output from a digitized incoming signal received at the receiver and converter to digital code at ADC 190. This subtracting may cancel the modeled nonlinear distortion from the transmitter in the received incoming signal.

A low pass filter 182 may be coupled to the ADC 181 and may attenuate the converted analog signals of the outgoing signal at ADC 181 that are higher than a predetermined cutoff frequency. A mixer 183 may be coupled to the low pass filter 182 and an oscillating signal selected to shift the frequency of the filtered analog signal from a baseband frequency to a transmission frequency used to transmit the outgoing filtered analog signal. A power amplifier 184 may be coupled to the mixer 183 to amplify the shifted signal from a low power RF signal to a high power signal for driving the transmitter antenna. The transmitter 185 may be coupled to the power amplifier 184 to transmit the high power signal.

Receiver 186 may be configured to receive incoming RF signals in a predetermined receive band. The receiver 186 may be coupled to an amplifier 187, which may be a low noise amplifier amplifying the incoming RF signals captured by the receiver 186 and/or its antenna.

The amplifier 187 may be coupled to a mixer 188. The mixer 188 may be coupled to an oscillating signal selected to shift the frequency of the amplified incoming signal to a predetermined baseband receiver frequency used in processing the received incoming signal.

A low pass filter 189 may be coupled to the mixer 188 and may attenuate the frequency shifted received incoming signals that are higher than a predetermined cutoff frequency. An ADC 190 may be coupled to the low pass filter 189 to convert the analog filtered incoming signals into digital codes. Additionally, while FIG. 1 illustrates a direct transmitter-receiver architecture, the all digital noise correction principles and components described herein, including but not limited to estimator circuits, mixers, and subtractors, may also be applied to other transmitter and/or receiver architectures, including superheterodyne, fixed intermediate frequency (IF), low intermediate frequency (LIF), and/or very low intermediate frequency (VLIF) architectures.

Figure 2:
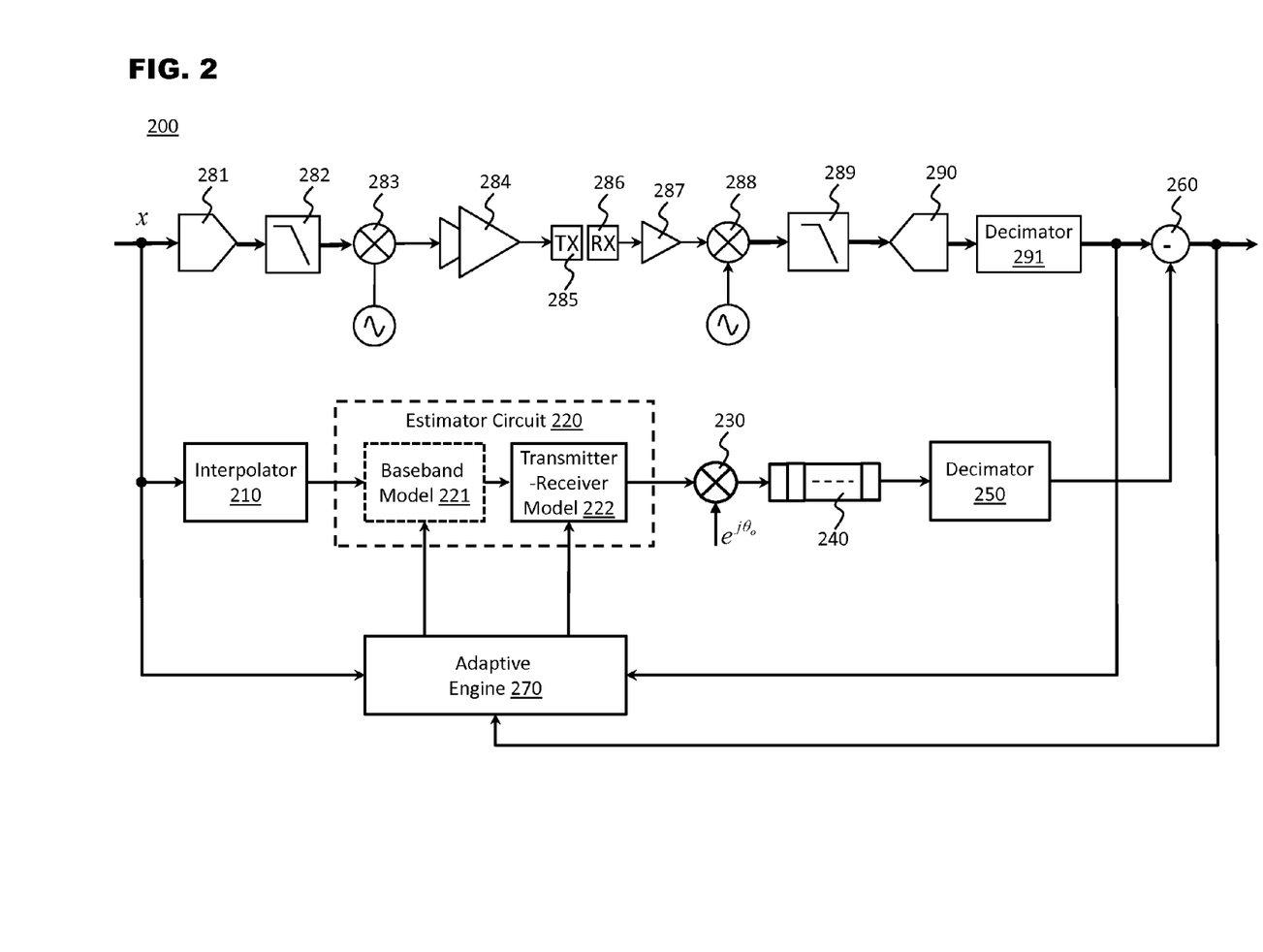
FIG. 2 shows a second exemplary circuit in an embodiment of the invention.

FIG. 2 shows a second exemplary all digital noise correction circuit 200 for a full duplex radio including a transmitter 285 and receiver 286. In circuit 200, an outgoing digital signal to be transmitted at transmitter 285 may be converted to an analog signal at an analog-digital converter (ADC) 281. A copy of the outgoing digital signal may also be routed to an interpolator 210 and/or an adaptive engine 270.

The interpolator 210 may interpolate the outgoing digital signal or at least a portion of the outgoing digital signal falling into a band of the incoming signal to prevent aliasing. The interpolator 210 may boost the sampling frequency of the outgoing digital signal in those instances where undersampling may occur because of a low frequency. The interpolator may be coupled to a estimator circuit 220.

The estimator circuit 220 may include one or more nonlinearity signal distortion models, which may include models 221 and 222. Nonlinear model 221 may include a filter and/or other components modeling nonlinear distortion from the transmitter 185 at the receiver 186 of a full duplex radio. Nonlinear model 221 may include a filter and/or other components modeling nonlinear distortion of the baseband signal prior to transmission at the transmitter 185. This nonlinear distortion may be caused by amplifiers or other sources of distortion in the baseband signal path.

Nonlinear model 222 may model a nonlinear signal distortion between the transmitter 285 and the receiver 286. The nonlinear distortion may be modeled based on an analysis of a copy of an outgoing digital signal that is subsequently converted to an analog signal and transmitted at the transmitter 285. In those instances where both nonlinear models 221 and 222 are used, the estimator circuit 220 may first model transmitter baseband nonlinearity before modeling nonlinearity between the transmitter 285 and the receiver 286 of the full duplex radio. The output of the transmitter baseband nonlinearity model 221 may be used as an input for the transmitter-receiver nonlinearity model 222.

A mixer 230 may be coupled to estimator circuit 220. The mixer 230 may mix an output of the estimator circuit 220 with a frequency offset signal. This mixing may shift the estimator circuit output to an intermediate frequency offset representing a difference between a transmit frequency and a receive frequency of the radio.

A delay unit 240 may be coupled to the mixer 230. The delay unit 240 may delay the estimator circuit output until the estimator circuit output is synchronized with a corresponding portion of the incoming signal at a subtractor 260.

A first decimator 250 may be coupled between the mixer 230 and the subtractor 260. The first decimator 250 may downsample the mixed estimator circuit output to a frequency of the incoming received signal or to another predetermined output frequency before the subtractor 260 subtracts the downsampled estimator output from the incoming signal.

A second decimator 291 may be coupled between the subtractor 260 and an ADC 290 converting the incoming received analog signal at the receiver 286 to digital code. The second decimator 250 may downsample the digitized incoming received signal to a predetermined output frequency matching that the of first decimator 250 before the subtractor 260 subtracts the decimated estimator output from the decimated digitized incoming signal. This subtracting may cancel the modeled nonlinear distortion from the transmitter in the received incoming signal.

A low pass filter 282 may be coupled to the ADC 281 and may attenuate the converted analog signals of the outgoing signal at ADC 281 that are higher than a predetermined cutoff frequency. A mixer 283 may be coupled to the low pass filter 282 and an oscillating signal selected to shift the frequency of the filtered analog signal from a baseband frequency to a transmission frequency used to transmit the outgoing filtered analog signal. A power amplifier 284 may be coupled to the mixer 283 to amplify the shifted signal from a low power RF signal to a high power signal for driving the transmitter antenna. The transmitter 285 may be coupled to the power amplifier 284 to transmit the high power signal.

Receiver 286 may be configured to receive incoming RF signals in a predetermined receive band. The receiver 286 may be coupled to an amplifier 287, which may be a low noise amplifier amplifying the incoming RF signals captured by the receiver 286 and/or its antenna.

The amplifier 287 may be coupled to a mixer 288. The mixer 288 may be coupled to an oscillating signal selected to shift the frequency of the amplified incoming signal to a predetermined baseband receiver frequency used in processing the received incoming signal.

A low pass filter 289 may be coupled to the mixer 288 and may attenuate the frequency shifted received incoming signals that are higher than a predetermined cutoff frequency. An ADC 290 may be coupled to the low pass filter 289 to convert the analog filtered incoming signals into digital codes.

An adaptive engine 270 may be coupled to the estimator circuit 220, a incoming received signal input to the subtractor 260, an output of the subtractor 260, interpolator 210 and/or an input to the estimator circuit 220. The adaptive engine 270 may be configured to compare an output of the subtractor 260 (after subtracting the mixed estimator circuit output from the digitized incoming signal) to the digitized incoming signal and the outgoing digital signal. The adaptive engine 270 may identify an error in the modeled nonlinearity at the estimator circuit 220 based on the comparing. The adaptive engine 270 may modify at least one nonlinearity model coefficient in one or more nonlinearity models, such as models 221 and/or 222, in the estimator circuit 220 to reduce the identified error.

The adaptive engine 270 may also be configured to iteratively compare the output of the subtractor 260 to the digitized incoming signal and the outgoing digital signal and modify at least one nonlinearity model coefficient in the estimator circuit 220 until the identified error is minimized. The identified error may be minimized when an error is no longer detectable or when the error falls below a predetermined error threshold.

Figure 3:
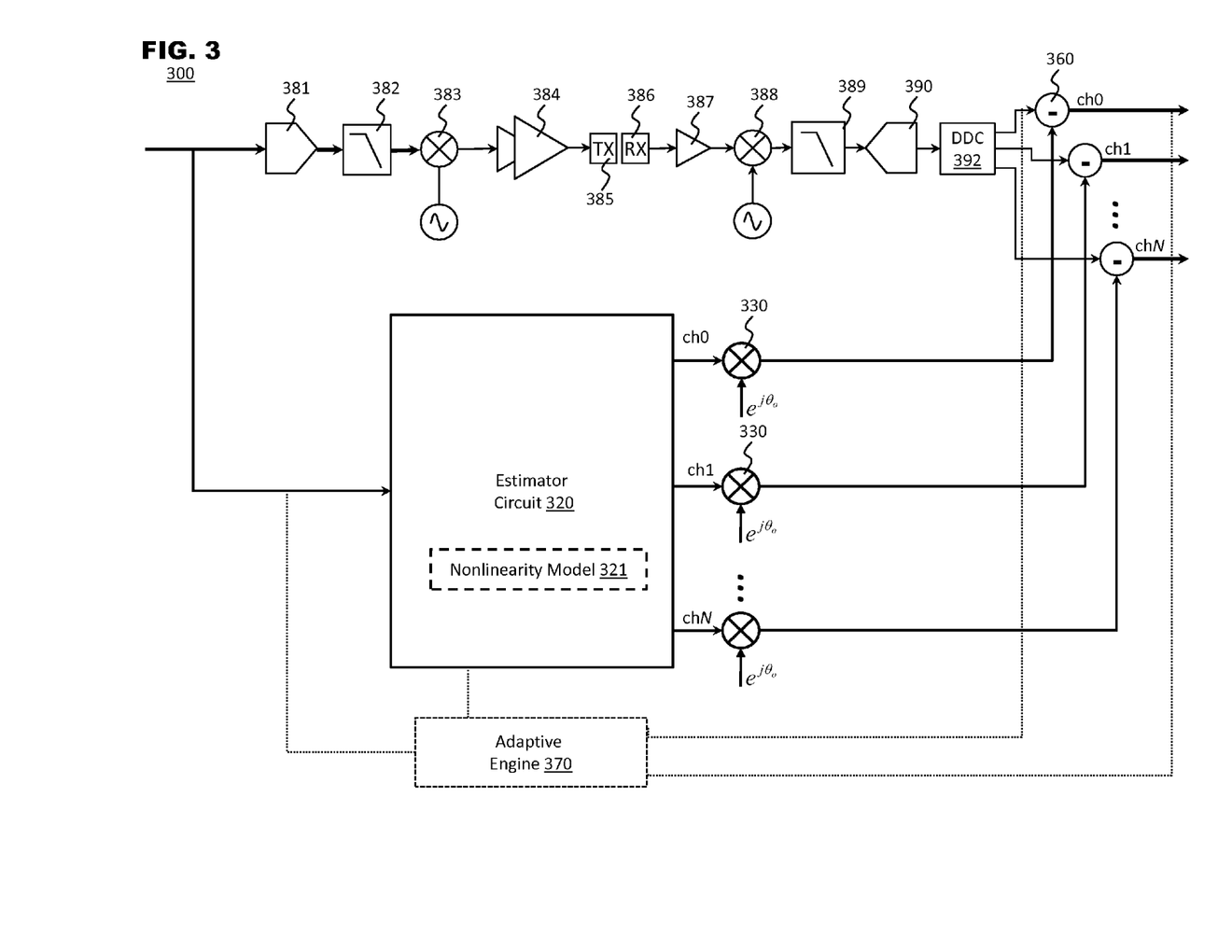
FIG. 3 shows a third exemplary circuit in an embodiment of the invention.

FIG. 3 shows a third exemplary all digital noise correction circuit 300 for a full duplex radio including a transmitter 385 and receiver 386. In circuit 300, an outgoing digital signal to be transmitted at transmitter 385 may be converted to an analog signal at an analog-digital converter (ADC) 381. A copy of the outgoing digital signal may also be channelized at a channelization circuit, such as a channel splitter 305, which may channelize the outgoing digital signal into separate channels (shown as channels ch0 to chN) by separating the outgoing digital signal into separate channels on a channel by channel basis and then separately outputting each channel.

An estimator circuit 320, mixer 330 and subtractor 360 may be provided each offor one or more of the channels. An estimator circuit 320 may receive a digitized outgoing signal before it is converted to an analog signal at ADC 381 and may be coupled to ADC 381. The estimator circuit 320 may also include a nonlinear signal distortion model 321 and may model nonlinear signal distortion between the transmitter 385 and the receiver 386 for one or more of the respective channels. The estimator circuit 320 may output a modeled distortion customized for each of the respective channels. A mixer 330 and subtractor 360 may be provided for each of the channels.

Each mixer 330 may be coupled to the estimator circuit 320. Each mixer 330 may mix an output of the estimator circuit 320 for the respective channel with a frequency offset signal for the respective channel.

Each subtractor 360 may be coupled to a mixer 330 for the respective channel and may subtract the mixed estimator circuit output for the respective channel from the channelized digitized incoming signal for the respective channel outputted by a channelization circuit, such as digital downconverter (DDC) 392, coupled to ADC 390. DDC 392 may channelize the incoming received signal from receiver 386 after it has been converted to digital code at ADC 390 into separate channels (shown as channels ch0 to chN) by separating the incoming digital signal into separate channels on a channel by channel basis and then separately outputting each channel.

The estimator circuit 320 may include one or more nonlinearity signal distortion models, which may include models 321, 221, and 222. A delay units and/or decimator, such as delay unit 240 and decimator 250 may be coupled to each mixer 330 on a channel by channel basis to synchronize the estimated distortion with a corresponding section of the received signal and/or downsample the mixed estimator circuit output for a respective channel to a frequency of the incoming received signal or to another predetermined output frequency before the subtractor 360 subtracts the downsampled estimator output from the incoming signal.

A second decimator may be coupled between the subtractor 360 and DDC 392 on a channel by channel basis to downsample the digitized incoming received signal to a predetermined output frequency.

A low pass filter 382 may be coupled to ADC 381 and may attenuate the converted analog signals of the outgoing signal at ADC 381 that are higher than a predetermined cutoff frequency. A mixer 383 may be coupled to the low pass filter 382 and an oscillating signal selected to shift the frequency of the filtered analog signal from a baseband frequency to a transmission frequency used to transmit the outgoing filtered analog signal. A power amplifier 384 may be coupled to the mixer 383 to amplify the shifted signal from a low power RF signal to a high power signal for driving the transmitter antenna. The transmitter 385 may be coupled to the power amplifier 384 to transmit the high power signal.

Receiver 386 may be configured to receive incoming RF signals in a predetermined receive band. The receiver 386 may be coupled to an amplifier 387, which may be a low noise amplifier amplifying the incoming RF signals captured by the receiver 386 and/or its antenna.

The amplifier 387 may be coupled to a mixer 388. The mixer 388 may be coupled to an oscillating signal selected to shift the frequency of the amplified incoming signal to a predetermined baseband receiver frequency used in processing the received incoming signal.

A low pass filter 389 may be coupled to the mixer 388 and may attenuate the frequency shifted received incoming signals that are higher than a predetermined cutoff frequency. An ADC 390 may be coupled to the low pass filter 389 to convert the analog filtered incoming signals into digital codes.

An adaptive engine 370 may be coupled to the estimator circuit 320 for one or more channels, the one or more channels of the channelized incoming received signal inputted to each subtractor 360, an output of the subtractor 360 for the one or more channels, and/or an input to the estimator circuit 320 for the one or more channels. The adaptive engine 370 may be configured to compare, on a channel by channel basis, an output of the subtractor 360 for the channel (after subtracting the mixed estimator circuit output from the digitized incoming signal) to the digitized incoming signal for the channel and the outgoing digital signal for the channel.

The adaptive engine 370 may identify an error in the modeled nonlinearity at the estimator circuit 320 for one or more channels based on the comparing. The adaptive engine 370 may modify at least one nonlinearity model coefficient in one or more nonlinearity models, such as model 321, in the estimator circuit 320 of one or more channels to reduce the identified error.

The adaptive engine 370 may also be configured to iteratively compare the output of the subtractor 360 to the digitized incoming signal and the outgoing digital signal on a channel by channel basis and modify at least one nonlinearity model coefficient for a respective channel in the estimator circuit 220 until the identified error for the respective channel is minimized. The identified error may be minimized when an error is no longer detectable or when the error falls below a predetermined error threshold.

Figure 4:
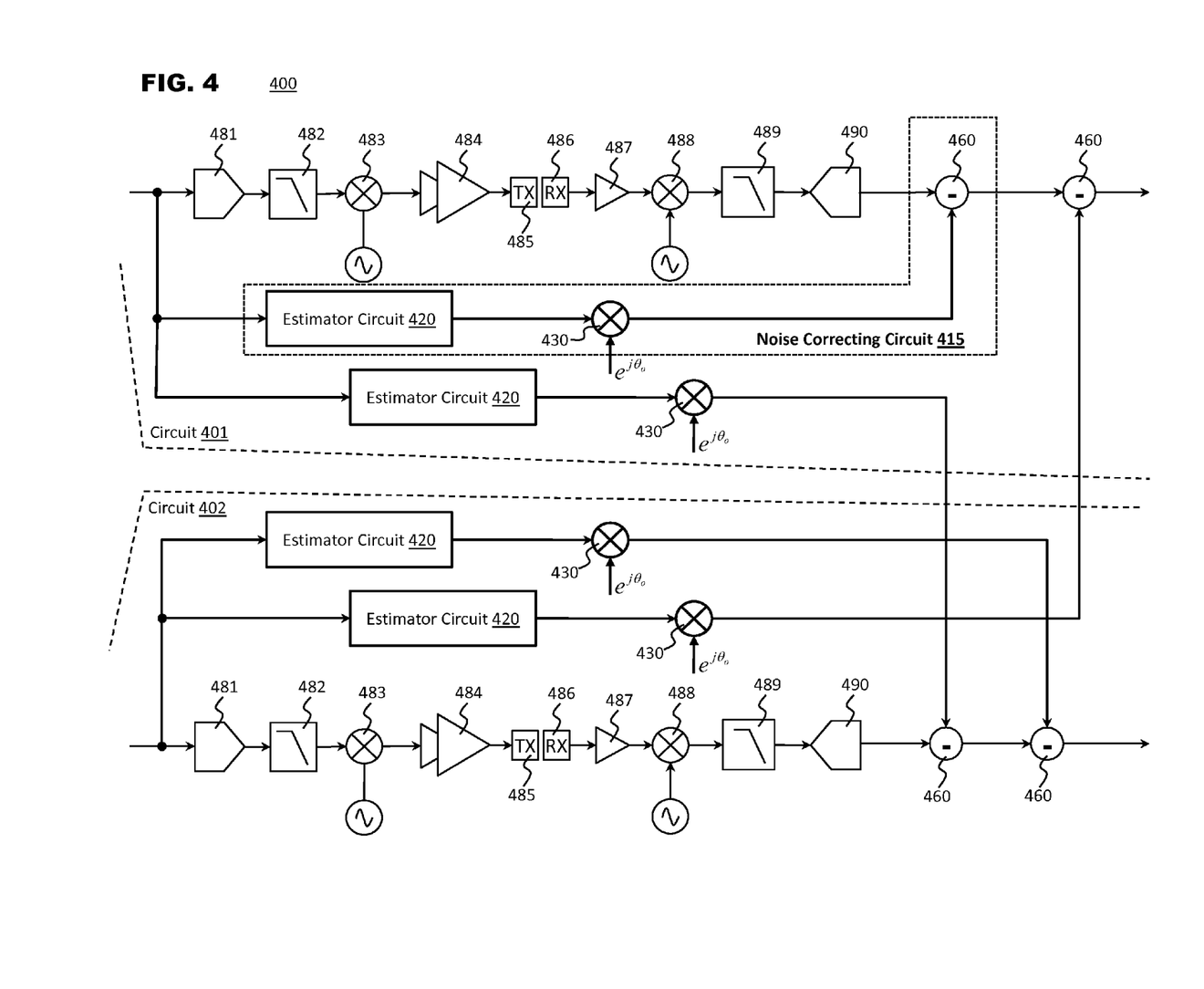
FIG. 4 shows a fourth exemplary circuit in an embodiment of the invention.

FIG. 4 shows a fourth exemplary all digital noise correction circuit 400 for a full duplex radio including two or more transmitters 485 and receivers 486. In circuit 400, which is shown as including two cross coupled transmitter-receiver circuits 401 and 402, each of which may be based on the configured of circuits 100, 200, and/or 300 in FIGS. 1, 2, and/or 3.

Each of the transmitter-receiver circuits 401 and 402 may include ADCs 481 and 490, filters 482 and 489, mixers 483 and 488, amplifiers 484 and 487, transmitter 485, and receiver 486. Low pass filter 482 may be coupled to ADC 481 and may attenuate the converted analog signals of the outgoing signal at ADC 481 that are higher than a predetermined cutoff frequency. Mixer 483 may be coupled to the low pass filter 482 and an oscillating signal selected to shift the frequency of the filtered analog signal from a baseband frequency to a transmission frequency used to transmit the outgoing filtered analog signal at each transmitter. A power amplifier 484 may be coupled to the mixer 483 to amplify the shifted signal from a low power RF signal to a high power signal for driving the transmitter antenna. The transmitter 485 may be coupled to the power amplifier 484 to transmit the high power signal.

Receiver 486 may be configured to receive incoming RF signals in a predetermined receive band. The receiver 486 may be coupled to an amplifier 487, which may be a low noise amplifier amplifying the incoming RF signals captured by the receiver 486 and/or its antenna.

The amplifier 487 may be coupled to a mixer 488. The mixer 488 may be coupled to an oscillating signal selected to shift the frequency of the amplified incoming signal to a predetermined baseband receiver frequency used in processing the received incoming signal.

A low pass filter 489 may be coupled to the mixer 488 and may attenuate the frequency shifted received incoming signals that are higher than a predetermined cutoff frequency. An ADC 490 may be coupled to the low pass filter 489 to convert the analog filtered incoming signals into digital codes.

Each of the transmitter-receiver circuits 401 and 402 may include a number of noise correcting circuits 415 in each circuit 401 and 402 equal to the number of transmitter-receiver circuits. In the example shown in FIG. 4, there are two circuits 401 and 402 and therefore two noise correcting circuits 415 are provided for each transmitter-receiver circuit 401 and 402. Each noise cancellation circuit 415 may include an estimator circuit 420, a mixer 430, and a subtractor 460.

If there are a number n of transmitter-receiver circuits, where n is two or more, then each of the n transmitter-receiver circuits may include n estimator circuits, mixers, and subtractors. Each of the n estimator circuits 420 may be coupled to the ADC 481 for the respective circuit 401 or 402 and/or its respective mixer 430. Each of the n subtractors 460 for each circuit 401 and 402 may be coupled to the digital output of the ADC 490 for a unique one of the n circuits 401 and 402, so that the modeled nonlinear transmitter distortion from the transmitter 485 in each of the circuits 401 and 402 is subtracted from the digitized received incoming signal at each of the receivers 486.

If the n transmitter-receiver circuits have their incoming and outgoing signals channelized, as shown in and described with respect to FIG. 3, then each of n transmitter-receiver circuits may have n estimator circuits, mixers, and subtractors for each active channel. Each of the n estimator circuits may be coupled to the respective channel output of the signal splitter for the respective circuit. The subtractor for each active channel may be coupled to the respective channel output of the digital downconverter for the respective circuit.

An adaptive engine, such as adaptive engines 270 and/or 370, may also be to each of the estimator circuits in the multi transmitter-receiver embodiments as discussed above with respect to FIGS. 2 and 3 to modify one or more model coefficients in the estimator circuits to further reduce an error in the model.

In some instances, a noise cancellation circuit 400 may include two or more receivers 485 and transmitters 486. Each of the receivers 485 may be coupled to a respective ADC 490 converting a received incoming analog RF signal to digital code. Each of the transmitters 486 may be coupled to a respective ADC 481 converting an outgoing digital code to an analog signal for transmission.

The noise cancellation circuit 400 may also include two or more digital noise correcting circuits 415. Each noise correcting circuit 415 may include an estimator circuit 420 coupled to a mixer 430 coupled to a subtractor 460, with at least one noise correcting circuit 415 coupled between each of the transmitter ADC 481 and each receiver ADC 490.

Each estimator circuit 420 may model nonlinear signal distortion between a respective transmitter 485 and a respective receiver 486 based on a digitized version of an outgoing signal transmitted at the respective transmitter 485. Each mixer 430 may mix an output of the respective estimator circuit 420 with a respective frequency offset signal. Each subtractor 460 may subtract the mixed estimator circuit output from the respective estimator circuit 420 from an incoming signal digitized at the respective receiver ADC 490.

Figure 5:
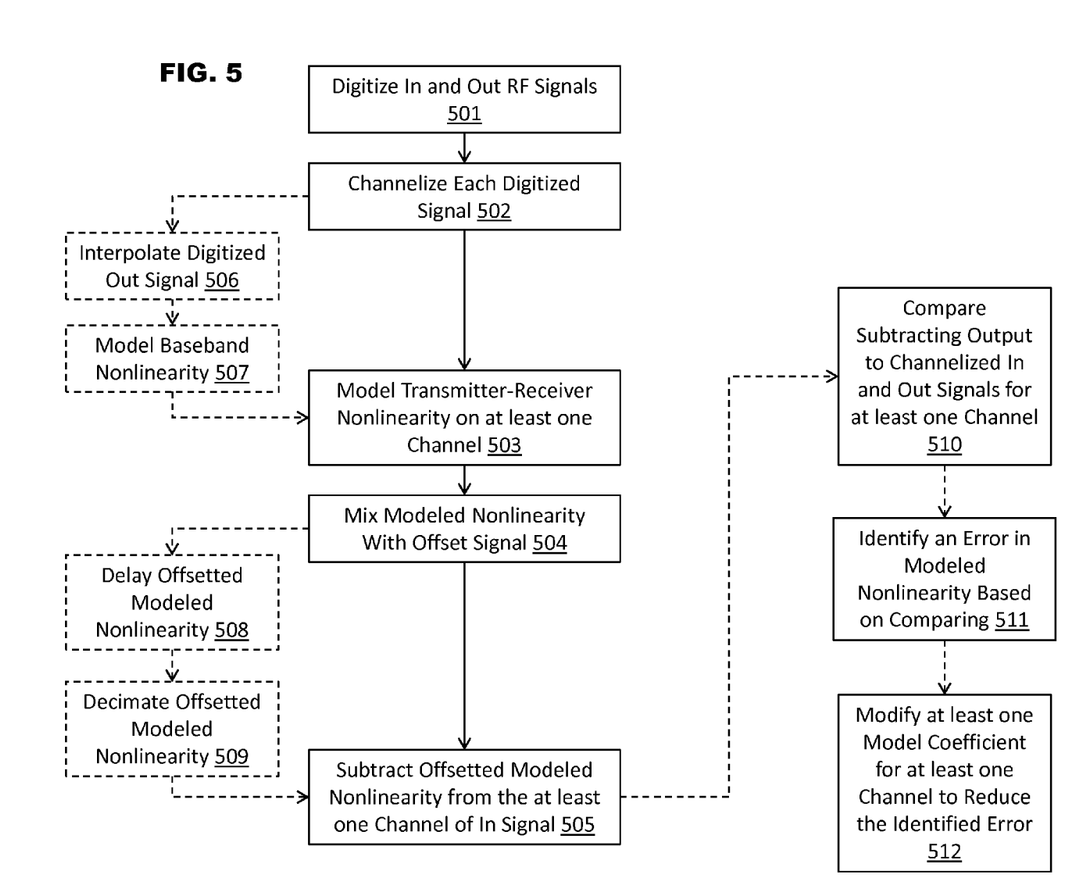
FIG. 5 shows exemplary methods in embodiments of the invention.

FIG. 5 shows exemplary methods in different embodiments. In box 501, incoming RF signals received at a receiver and outgoing signals for transmission at a RF transmitter may be digitized. In some instances, different incoming radio frequency (RF) signals received at different receivers and different outgoing RF signals for transmission at different transmitters may be digitized.

In box 502, the digitized incoming and outgoing RF signals may be channelized and split into one or more channels on a channel by channel basis.

In box 503, nonlinear signal distortion between the transmitter and the receiver on at least one channel may be modeled based on an analysis of at least one of the channelized outgoing signals. In instances where there is more than one transmitter and receiver, the nonlinear distortion may be modeled between each of the transmitters and at least one of the receivers on at least one channel based on an analysis of at least one of the channelized outgoing signals at each of the transmitters.

In box 504, the modeled distortion on at least one channel may be mixed with an offset signal offsetting the modeled distortion based on a difference in angular frequencies of the at least one channel of the transmitter and the receiver. In instances where there is more than one transmitter and receiver, the modeled nonlinear distortion may be mixed between each of the transmitters and the at least one receiver on at least one channel with an offset signal offsetting the modeled nonlinear distortion based on a difference in angular frequencies of the at least one channel of each respective transmitter and the at least one receiver.

In box 505, the offsetted modeled distortion may be subtracted from the at least one channel of the channelized incoming RF signal. In instances where there is more than one transmitter and receiver, the offsetted modeled nonlinear distortion may be subtracted between each of the transmitters and the at least one receiver from the respective channelized incoming RF signal received at the at least one receiver.

In box 506, the digitized outgoing signals may be interpolated before modeling nonlinear distortion in box 503.

In box 507, a nonlinear transmitter baseband signal distortion may be modeled based on an analysis of at least one of the channelized outgoing signals before modeling nonlinear distortion between the transmitter and the receiver in box 503. The modeling of the nonlinear distortion between the transmitter and the receiver in box 503 may be performed using a result of the modeling of the transmitter baseband signal distortion in box 507.

In box 508, offsetted modeled nonlinear distortion may be delayed until the offsetted modeled nonlinear distortion is time aligned with a corresponding section of the channelized incoming RF signal before decimating the offsetted modeled nonlinearity in box 509.

In box 509, the offsetted modeled nonlinear distortion may be decimated before performing the subtracting in box 505.

In box 510, an output of the subtracting in box 505 may be compared to the channelized incoming signal and the channelized outgoing signal for the at least one channel.

In box 511, a modeling error for the at least channel may be identified based on the comparing.

In box 512, at least one nonlinearity model coefficient in the may be modified in the modeling for the at least one channel to reduce the identified error.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, in some embodiments the channelization of the incoming signals may be performed by a digital down converter but in other instances the channelization may be performed independent of the down conversion by the digital down converter.

We claim:

1. A circuit comprising:
an estimator circuit modeling nonlinear signal distortion from a transmitter at a receiver based on an analysis of an outgoing digital signal converted to an analog signal and transmitted at the transmitter;
a mixer mixing an output of the estimator circuit with a frequency offset signal and shifting the estimator circuit output to an intermediate frequency offset representing a difference between frequencies of the transmitter and the receiver; and
a subtractor coupled to the mixer and subtracting the frequency shifted estimator circuit output from a digitized incoming signal received at the receiver;
a delay unit delaying the estimator circuit output until the estimator circuit output is synchronized with a corresponding portion of the incoming signal at the subtractor; and
a decimator downsampling the mixed estimator circuit output to a frequency of the incoming signal before the subtractor subtracts the downsampled estimator output from the incoming signal.

2. The circuit of claim 1, further comprising:
an interpolator coupled to the estimator and interpolating a portion of the outgoing digital signal falling into a band of the incoming signal, wherein
the delay unit is coupled to the mixer, and
the decimator is coupled between the mixer and the subtractor.

3. The circuit of claim 1, wherein the estimator circuit models a transmitter baseband nonlinearity before modeling nonlinearity between the transmitter and the receiver, the output of the transmitter baseband nonlinearity model used as an input for the modeling of nonlinearity between the transmitter and the receiver.

4. The circuit of claim 3, wherein the estimator circuit:
(i) models transmitter baseband nonlinearity at least in part as:

$$x = \{I_i + jQ_i\}\alpha_0 + \sum_{k=1}^{K_{BB}}\sum_{m=0}^{M_{BB}} \alpha_{k,m} I_i^k(n-m) + j\sum_{k=1}^{K_{BB}}\sum_{m=0}^{M_{BB}} \beta_{k,m} Q_i^k(n-m),$$

where I is an in phase component of the outgoing digital signal, Q is an out of phase component of the outgoing digital signal, j is an imaginary unit, $\alpha$ and $\beta$ are model coefficients of the modeled transmitter baseband nonlinearity, m represents an index of values of associated variables, k represents an order of nonlinearity, n represents a time index, and x is an output of the modeled transmitter baseband nonlinearity; and
(ii) models nonlinearity between the transmitter and the receiver at least in part as:

$$y = \sum_{k=0}^{K_{RF}}\sum_{m_1=0}^{M_1}\sum_{m_2=0}^{M_2} a_{k,m_1,m_2} |x(n-m_1)|^{2k} x(n-m_1-m_2),$$

where a refers to model coefficients of the modeled nonlinearity between the transmitter and the receiver, $m_1$ and $m_2$ refer to different indices of the variable m, and y is an output of the modeled nonlinearity between the transmitter and the receiver.

5. The circuit of claim 1, further comprising an adaptive engine coupled to the estimator circuit and the subtractor, the adaptive engine configured to:
compare an output to the digitized incoming signal and the outgoing digital signal;
identify an error in the modeled nonlinearity at the estimator circuit based on the comparing; and
modify at least one nonlinearity model coefficient in the estimator circuit to reduce the identified error.

6. The circuit of claim 5, wherein the adaptive engine is further configured to iteratively compare the output of the subtractor to the digitized incoming signal and the outgoing digital signal and modify at least one nonlinearity model coefficient in the estimator circuit until the identified error is minimized.

7. The circuit of claim 3, further comprising an adaptive engine coupled to the estimator circuit and the subtractor, the adaptive engine configured to:
compare an output of the subtractor after subtracting the mixed estimator circuit output from the digitized incoming signal to the digitized incoming signal and the outgoing digital signal;
identify an error in each of the modeled nonlinearities at the estimator circuit based on the comparing; and
modify at least one nonlinearity model coefficient of each model in the estimator circuit to reduce the identified error.

8. The circuit of claim 1, further comprising:
the transmitter;
the receiver;
a power amplifier coupled to the transmitter;
a first analog to digital converter (ADC) coupled to the power amplifier and converting the outgoing digital signal to the analog signal;
a second ADC coupled between the receiver and the subtractor, the second ADC digitizing the incoming signal received at the receiver;
a mixer coupled between the receiver and the second ADC, the mixer mixing the incoming signal with an oscillating signal;
a radio frequency amplifier coupled between the receiver and the mixer; and
a low pass filter coupled between the mixer and the second ADC.

9. The circuit of claim 8, further comprising:
a digital downconverter coupled to the second ADC and downconverting and channelizing at separate outputs the digitized incoming signal; and
a plurality of mixers and subtractors, with a mixer and a subtractor for each channel, wherein:
the estimator circuit models nonlinearity between the transmitter and the receiver for each respective channel and outputs the modeled nonlinearity to a respective mixer for the respective channel,
each mixer mixes an output of the estimator circuit for the respective channel with a frequency offset signal for the respective channel, and
each subtractor is coupled to a mixer for the respective channel and subtracts the mixed estimator circuit output for the respective channel from the channelized digitized incoming signal for the respective channel outputted by the digital downconverter.

10. The circuit of claim 9, further comprising an adaptive engine coupled to the estimator circuit and the subtractor for each channel, the adaptive engine configured to:
compare an output of the subtractor of at least one channel after subtracting the mixed estimator circuit output for the at least one channel to the channelized incoming signal and the outgoing signal for the at least one channel;
identify an error in the modeled nonlinearity at the estimator circuit for the at least channel based on the comparing; and
modify at least one nonlinearity model coefficient in the estimator circuit for the at least one channel to reduce the identified error.

11. A multi transmitter-receiver noise cancellation circuit comprising a number n≥2 of circuits of claim 9, wherein each of the n circuits of claim 9 includes:
n estimator circuits, mixers, and subtractors for each active channel;
each of the n estimator circuits for each active channel is coupled to the respective channel output of the signal splitter for the respective circuit; and
the subtractor for each active channel is coupled to the respective channel output of the digital downconverter for the respective circuit.

12. The circuit of claim 1, further comprising:
a channelization circuit splitting the outgoing digital signal and the digitized incoming signal on a channel by channel basis and separately outputting each channel; and
a plurality of estimator circuits, mixers, and subtractors, with an estimator circuit, a mixer, and a subtractor for each channel, wherein:
each estimator circuit models nonlinear signal distortion between the transmitter and the receiver for each respective channel,
each mixer mixes an output of the estimator circuit for the respective channel with a frequency offset signal for the respective channel, and
each subtractor is coupled to a mixer for the respective channel and subtracts the mixed estimator circuit output for the respective channel from the channelized digitized incoming signal for the respective channel outputted by the channelization circuit.

13. A noise cancellation circuit comprising:
a plurality of receivers, each coupled to a respective analog-digital converter (ADC);
a plurality of transmitters, each coupled to a respective ADC; and
a plurality of digital noise correcting circuits, each noise correcting circuit including an estimator circuit coupled to a mixer coupled to a subtractor and including a delay circuit and a decimator, with at least one noise correcting circuit coupled between each of the transmitters and the receiver ADCs, wherein:
each estimator circuit models nonlinear signal distortion between a respective transmitter and a respective receiver based on a digitized version of an outgoing signal transmitted at the respective transmitter,
each mixer mixes an output of the respective estimator circuit with a respective frequency offset signal,
each subtractor subtracts the mixed estimator circuit output from the respective estimator circuit from an incoming signal digitized at the respective receiver ADC,
each delay unit delays the estimator circuit output until the estimator circuit output is synchronized with a corresponding portion of an incoming signal, and
each decimator downsamples the mixed estimator circuit output to a frequency of an incoming signal.

14. The noise cancellation circuit of claim 13, wherein the mixed estimator circuit output represents a difference between frequencies of the respective transmitter and the receiver.

15. A method comprising:
digitizing incoming radio frequency (RF) signals received at a receiver and outgoing signals for transmission at a RF transmitter;
channelizing the digitized incoming and outgoing signals;
modeling nonlinear signal distortion between the transmitter and the receiver on at least one channel based on an analysis of at least one of the channelized outgoing signals;
mixing the modeled distortion on at least one channel with an offset signal offsetting the modeled distortion based on a difference in angular frequencies of the at least one channel of the transmitter and the receiver;
delaying offsetted modeled nonlinear distortion until the offsetted modeled nonlinear distortion is time aligned with a corresponding section of the channelized incoming RF signal;
decimating the delayed modeled nonlinear distortion; and
subtracting the decimated modeled distortion from the at least one channel of the channelized incoming RF signal.

16. The method of claim 15, further comprising:
interpolating the digitized outgoing signals before modeling nonlinear distortion.

17. The method of claim 15, further comprising:
modeling a nonlinear transmitter baseband signal distortion based on an analysis of at least one of the channelized outgoing signals before modeling nonlinear distortion between the transmitter and the receiver; and
modeling the nonlinear distortion between the transmitter and the receiver using a result of the modeled nonlinear transmitter baseband signal distortion.

18. The method of claim 15, further comprising:
interpolating the digitized outgoing signal before modeling nonlinear distortion;
modeling a nonlinear transmitter baseband signal distortion based on an analysis of at least one of the channelized outgoing signals before modeling nonlinear distortion between the transmitter and the receiver;
modeling the nonlinear distortion between the transmitter and the receiver using a result of the modeled nonlinear transmitter baseband signal distortion;
delaying the modeled nonlinear distortion between the transmitter and the receiver until the modeled nonlinear distortion between the transmitter and the receiver is time aligned with a corresponding section of the channelized incoming RF signal; and
decimating the delayed modeled nonlinear distortion between the transmitter and the receiver after an end of the delaying.

19. The method of claim 15, further comprising:
digitizing a plurality of incoming radio frequency (RF) signals received at a plurality of receivers and a plurality of outgoing signals for transmission at a plurality of RF transmitters;
channelizing each of the digitized incoming and outgoing signals;
modeling nonlinear distortion between each of the transmitters and at least one of the receivers on at least one channel based on an analysis of at least one of the channelized outgoing signals at each of the transmitters;
mixing the modeled nonlinear distortion between each of the transmitters and the at least one receiver on at least one channel with an offset signal offsetting the modeled nonlinear distortion based on a difference in angular frequencies of the at least one channel of each respective transmitter and the at least one receiver; and subtracting the offsetted modeled nonlinear distortion between each of the transmitters and the at least one receiver from the respective channelized incoming RF signal received at the at least one receiver.

20. The method of claim 15, further comprising:

comparing an output of the subtracting to the channelized incoming signal and the channelized outgoing signal for the at least one channel;

identifying a modeling error for the at least channel based on the comparing; and modifying at least one nonlinearity model coefficient in the modeling for the at least one channel to reduce the identified error.

\* \* \* \* \*

UNITED STATES PATENT AND TRADEMARK OFFICE
CERTIFICATE OF CORRECTION

| | | |
|---|---|---|
| PATENT NO. | : 9,048,900 B2 | |
| APPLICATION NO. | : 13/796236 | |
| DATED | : June 2, 2015 | |
| INVENTOR(S) | : Pratt et al. | |

It is certified that error appears in the above-identified patent and that said Letters Patent is hereby corrected as shown below:

In the specification

In column 4, line 29, change "an analog-digital converter (ADC) 181" to --a digital-analog converter (DAC) 181--
In column 4, line 53, change "ADC 181" to --DAC 181--
In column 4, line 55, change "ADC 181" to --DAC 181--

In column 5, line 26, change "an analog-digital converter (ADC) 281" to --a digital-analog converter (DAC) 281--

In column 6, line 17, change "ADC 281" to --DAC 281--
In column 6, line 19, change "ADC 281" to --DAC 281--

In column 7, line 2, change "an analog-digital converter (ADC) 381" to --a digital-analog converter (DAC) 381--
In column 7, line 12, change "ADC 381" to --DAC 381--
In column 7, line 13, change "ADC 381" to --DAC 381--
In column 7, line 51, change "ADC 381" to --DAC 381--
In column 7, line 53, change "ADC 381" to --DAC 381--

In column 8, line 46, change "ADCs 481 and 490" to --DAC 481 and ADC 490--
In column 8, line 48, change "ADC 481" to --DAC 481--
In column 8, line 50, change "ADC 481" to --DAC 481--
In column 9, line 20, change "ADC 481" to --DAC 481--
In column 9, line 48, change "ADC 481" to --DAC 481--
In column 9, line 59, change "ADC 481" to --DAC 481--

Signed and Sealed this
Twenty-first Day of June, 2016

Michelle K. Lee
*Director of the United States Patent and Trademark Office*

CERTIFICATE OF CORRECTION (continued)
U.S. Pat. No. 9,048,900 B2

In the claims

In column 12, line 32, change "a first analog-digital converter (ADC)" to --a digital-analog converter (DAC)--
In column 12, line 35, change "a second ADC" to --an analog-digital converter (ADC)--
In column 12, line 36, change "the second ADC" to --the ADC--
In column 12, line 38, change "the second ADC" to --the ADC--
In column 12, lines 43-44, change "the second ADC" to --the ADC--
In column 12, line 46, change "the second ADC" to --the ADC--

In column 13, line 43, change "ADC" to --digital-analog converter (DAC)--
In column 13, line 48, change "transmitters" to --transmitter DACs--